Patented June 26, 1945

2,379,335

UNITED STATES PATENT OFFICE 2,379,335

TREATMENT OF CEREALS

John C. Baker, Montclair, N. J., assignor to Novadel-Agene Corporation, a corporation of New Jersey No Drawing. Application March 1, 1941, Serial No. 381,394

4 Claims. (Cl. 83—28)

This invention relates to the treatment of cereals in whole grain form in such manner as to bleach water-extractable coloring matter, cause sterilization, and improve the tempering of those grains that are ordinarily tempered with water prior to milling.

The invention is particularly useful in the treatment of wheat, barley, rye, and like cereals.

It is customary to temper wheat before milling with a limited proportion of water, partly to facilitate the separation of bran from the other parts of the wheat. If the tempering water is unevenly distributed over the wheat so as to produce a local excess, undesirable changes such as growth of bacteria and molds may occur to an extent so large as to be seriously detrimental. In order to avoid such objectionable changes during or after tempering, the tempering water is sometimes added in relatively small proportions, with a resting period between the addition of successive increments. In this way there has been decreased the accumulation of excess water on the surface of any part of the wheat and the likelihood of the bacterial or mold growth. There has been need of a satisfactory method which would make possible the addition of the tempering water rapidly, even to dry wheat requiring the largest proportion of water, without danger of bacterial or mold growth.

My invention provides such a method and also leads to improvement of the flour produced in milling the treated wheat. The invention makes possible the addition of the tempering water to any wheat all at one time, without the need of resting periods during the addition, the disinfecting and bleaching of the exterior portions of the grains of wheat, and the bleaching of water-extractable material of the bran, so that there is minimized discoloration of interior portions of the wheat by coloring matter extracted from the bran during the tempering operation.

Briefly stated, my invention comprises the treatment of grains of a cereal with chlorine dioxide in the presence of water. In the preferred embodiment, the invention comprises the use of the chlorine dioxide in conjunction with an agent such as chlorine that is more active in oxidizing the reducing substances of the cereal than is chlorine dioxide, so that the chlorine dioxide is not consumed too readily by the reducing substances and is spared for the more slowly effected bleaching and improving reactions. The invention as applied to wheat comprises treatment of wheat with chlorine dioxide simultaneously with or after the tempering step.

In one embodiment of the invention, cereal to be milled is treated with alkali also, so that the chlorine dioxide reacts with the alkali and gives a substantial amount of chlorite and chlorate, which, during the subsequent milling, become thoroughly incorporated into the products of the milling, with resultant improvement of the milled product. In another modification, the cereal is treated with a peroxide in addition to the alkali, so as to minimize the proportion of the chlorine dioxide which is converted to chlorate and increase the proportion converted to the desired chlorite.

The proportion of chlorine dioxide used may be varied within limits, the exact proportion depending upon the mildness or severity of the treatment required and upon the original quality of a particular lot of the cereal or cereal product to be treated. Ordinarily the proportion of chlorine dioxide is about 30 to 500 parts for a million parts dry weight of the cereal. Dosages within the upper part of this range are ordinarily not necessary or desirable, although greatly improved color of the wheat, for example, may result from such large dosages.

Chlorine or a nitrogen trihalide are used to advantage in admixture with the chlorine dioxide and in proportions of the same order as the proportion of chlorine dioxide, say, within the range of 30 to 500 parts by weight per million of cereal to be treated.

The use of chlorine along with chlorine dioxide is particularly desirable in cases where the material is badly infected. The chlorine is more reactive with reducing agents in the cereal than is the dioxide and, therefore, is preferentially consumed by such agents, leaving the chlorine dioxide to disappear at a decreased rate and accomplish more difficultly realizable effects such as color improvement and formation of chlorite.

Nitrogen trichloride or bromide when used in combination with the chlorine dioxide has, like chlorine, a powerful antiseptic action and also is effective in deodorizing the cereal.

Particularly good results have been obtained in the treatment of wheat when the treating mixture not only contains chlorine dioxide mixed with chlorine, nitrogen trichloride, or like active oxidizing agent but also contacts the wheat in the presence of a water-soluble chlorite or a compound adapted to react with chlorine dioxide to form chlorite. The chlorite present after the treatment is milled into the flour during the milling operation and causes an improvement in the baking quality of the flour.

The chlorite may be added as such, say, in the form of a solution in the tempering water of a water-soluble chlorite such as sodium, potassium, or calcium chlorite. Or, the chlorite may be formed in situ. In this latter modification of the general method, the cereal in air-dry form is treated with a dilute solution of a suitable alkali before or as the chlorine dioxide is applied. Alkalies that are suitable for the purpose are the sodium and potassium bicarbonates, hydroxides, borates, acetates, phosphates, or such of the corresponding calcium and magnesium compounds as are soluble in water. These alkaline substances are inorganic and are not volatile.

When the chlorine dioxide contacts the wheat including in its surface portions such added alkaline material and to a lesser extent a very small amount of alkali material naturally occurring in the wheat, reaction proceeds with the formation of chlorite and chlorate. Since the resulting chlorite and chlorate are incorporated into the flour during milling, there is a substantial improvement of the strength or baking quality of the flour due to the chlorite content, chlorate in smaller proportion than the chlorite being also beneficial.

To increase further the proportion of desired chlorite formed, the cereal, suitably wheat, may be treated with a peroxide, as for example, with sodium, potassium, calcium, or like peroxide of substantial solubility in water. The effect of the peroxide is to increase somewhat the proportion of the chlorine dioxide which is converted to chlorite rather than to chlorate.

When the treatment with an alkaline substance in addition to chlorine dioxide is employed, the proportion of such substance used is preferably not substantially more than the amount required theoretically to react with the chlorine dioxide to give chlorite and chlorate. Suitably, the amount of alkaline material used is somewhat less than this amount, so that an excess of the chlorine dioxide is left in contact with the wheat after the reaction with the alkali is substantially complete.

In the case of wheat, the alkaline substance may be added in the form of a solution in the tempering water, the concentration being very low and just adequate to contain the total amount of alkaline material that is preferred for its reaction with the chlorine dioxide.

The peroxide, if used, also is present in small proportion, say, somewhat less than that required theoretically to convert all of the chlorine dioxide in the presence of sodium carbonate or the like to sodium chlorite.

The invention will be illustrated in greater detail by description in connection with the tempering of wheat.

The treatment of the wheat with the chlorine dioxide, alone or with the other gaseous agents described, is effected ordinarily at very great dilution with an inert gas and at approximately room temperature. The treatment may be applied to a stream of wheat and suitably to wheat that is being agitated, as in a mixing conveyor.

The active treating gas is diluted with air, nitrogen, or the like inert gas, as in the proportion of about 0.3 to 2 parts of the gas by volume to 100 parts of the diluted mixture. The proportion of air is made large for convenience in metering and to maintain the chlorine dioxide at a concentration below that at which its explosibility becomes a hazard.

In case the proportion of chlorine dioxide used is relatively large, there is produced an odor somewhat similar to that which is obtained when wheat is treated with chlorinated water. This odor ordinarily disappears promptly from the wheat. If, however, the odor does not disappear in the time that may be allowed, then the wheat is dried and aerated, to remove the chlorine dioxide odor, and is subsequently remoistened with a few per cent of water prior to milling.

Wheat contacted with chlorine dioxide as described may be tempered by water added to the wheat quickly, there being no appreciable bacterial or mold growth even though the water may accumulate for a time on the surface of a part of the wheat. Furthermore, the wheat berry is stabilized and odors associated with inferior wheat are destroyed. There is desirable bleaching of the exterior of the wheat and of water-extractable color and the formation of chlorates and chlorites particularly if an alkaline substance has been added and reacted with some of the chlorine dioxide.

Wheat treated as described and then made into flour and other products produces a flour that shows practically no tendency to cause ropiness when the flour is used to make bread.

In a typical example of the practice of the invention with wheat, there is first applied to the wheat an aqueous solution in the proportion of 5 or 6 parts of the solution to 100 parts of wheat. The exact amount of the solution added varies with the original moisture content of the wheat, the amount added being that required to raise the total moisture content to about 16%. The solution as used may contain sodium peroxide and either sodium chlorite or sodium carbonate as stated above.

The solution, which constitutes the tempering medium and eventually serves as a source of chlorite, either added as such or produced by reaction with chlorine dioxide, is applied to the wheat at ordinary temperatures, in apparatus that in design is conventional for use in tempering but is constructed of materials resistant to corrosion by chlorine dioxide and chlorine. Upon the wheat in the same apparatus, there is passed a gaseous mixture including approximately two molecular proportions of chlorine dioxide for one of chlorine, diluted with air in the ratio of 99 parts or so of air to about 1 part of the active gases.

Treatment with the aqueous solution and the gaseous mixture is continued until the water is distributed satisfactorily in the wheat and the active gases are largely reacted, that is, combined or absorbed within the wheat. Ordinarily a period of about 1 to 5 minutes is adequate for the combined tempering and gas treatment.

While particularly good results are obtained from the use of all these materials, it will be understood that the various chemicals other than chlorine dioxide may be omitted if their function in connection with the chlorine dioxide to improve the product in the features described is not wanted for a particular use of the product. Thus addition of the alkaline substance may be omitted if it is not desired to have a relatively large content of chlorite in the finished product. Likewise the tempering water in the treatment of wheat may be omitted if it is not desired to temper the wheat. Some water should be present, however, during the treatment of a cereal, the proportion of moisture in equilibrium with the cereal exposed to the atmosphere being adequate except in those instances in which it is necessary to bleach thoroughly the water-extractable coloring material. If no alkaline substance is used to provide means for fixing chlorine dioxide as chlorite, then the peroxide should also be omitted.

While the invention is particularly important in the treatment of wheat, there may be substituted for the wheat other cereals that are to be kept for some time in contact with water, as in tempering, or are to be bleached and sterilized. Thus, there may be used rye, barley, or like cereal, such cereal being substituted pound for pound on the dry basis for wheat in the treatments described above.

Apparatus and conditions of treatment of the other cereals may be those in which or with which the material is conventionally handled or processed, except that the materials of construction of the apparatus must be inert to and resistant to corrosion by the treating chemical or chemicals. The treatment should include agitation so as to make possible satisfactory distribution of the chemical or chemicals throughout the entire mass of material being treated.

It will be understood that the details given are for the purpose of illustration and that variations within the spirit of the invention are to be included within the scope of the appended claims.

What I claim is:

1. In preparing wheat for milling into flour and other products, the method which comprises treating the wheat with a dilute mixture of chlorine dioxide and chlorine in air and an aqueous solution of an added non-volatile inorganic water soluble alkaline substance adapted to react with chlorine dioxide to form a chlorite, the water in the said solution tempering the wheat and the chlorite formed remaining as an improver of products made on milling the wheat.

2. In preparing wheat for milling into flour and other products, the method which comprises treating the wheat with a dilute mixture of chlorine dioxide in air, a peroxide, and an inorganic water soluble alkaline substance serving to form a chlorite with the chlorine dioxide, the peroxide and chlorite being added in aqueous solution, the liquid water of the solution tempering the wheat, and the peroxide increasing the proportion of chlorine dioxide which is converted by the alkaline substance to chlorite.

3. The method of tempering wheat preparatory to milling which comprises contacting the wheat in whole grain form with water added in liquid form and in proportion to temper the wheat and with a gaseous mixture of chlorine dioxide and chlorine in air, the chlorine dioxide being present in the ratio of approximately 2 volumes to 1 volume of chlorine, the chlorine dioxide and chlorine together constituting 0.3 to 2 parts by volume for 100 parts of the gaseous mixture, and the chlorine acting rapidly upon oxidizable substances in the exterior of the grain of wheat and the chlorine dioxide acting less rapidly, so that the chlorine constitutes a sparing agent for the chlorine dioxide and protects it against premature reduction by oxidizable substances in the surface portions of the grains of wheat.

4. The method of tempering wheat preparatory to milling which comprises contacting the wheat in whole grain form with water added in liquid form and in proportion to temper the wheat and with a gaseous mixture of chlorine dioxide and chlorine in air, the chlorine dioxide and chlorine together constituting 0.3 to 2 parts for 100 parts of the said mixture, the chlorine dioxide being present in the proportion of 30 to 500 parts by weight and the chlorine in the proportion of 30 to 500 parts by weight for 1,000,000 parts of the wheat.

JOHN C. BAKER.